Fig. 1

T. W. SMALL.
DISPLAY APPARATUS.
APPLICATION FILED MAY 26, 1915.

1,308,200.

Patented July 1, 1919.
8 SHEETS—SHEET 3.

Fig. 3

Witnesses
H. J. Small
R. L. Bruck

Inventor
Thomas W. Small
By Hull, Smith, Brock & West
Attys

T. W. SMALL.
DISPLAY APPARATUS.
APPLICATION FILED MAY 26, 1915.

1,308,200.

Patented July 1, 1919.
8 SHEETS—SHEET 4.

Witnesses
H. J. Small
R. L. Bruck

Inventor
Thomas W. Small
Hull, Smith, Brock, & West
By
Attys.

Fig. 6

UNITED STATES PATENT OFFICE.

THOMAS W. SMALL, OF CLEVELAND, OHIO.

DISPLAY APPARATUS.

1,308,200. Specification of Letters Patent. Patented July 1, 1919.

Application filed May 26, 1915. Serial No. 30,484.

*To all whom it may concern:*

Be it known that I, THOMAS W. SMALL, a citizen of the United States, residing at Cleveland, in the county of Cuyahoga and State of Ohio, have invented a certain new and useful Improvement in Display Apparatus, of which the following is a full, clear, and exact description, reference being had to the accompanying drawings.

This invention relates to a mechanism sometimes called display apparatus, whereby a fabric sheet or strip may be moved intermittently past an opening so as to exhibit signs, advertisements, directions, or the like. Some mechanisms of this nature are called station indicators, or street indicators and are used for trolley cars and other vehicles to exhibit the names of the streets or stations, sometimes in connection with the advertisements of merchants located at or near those streets or stations; other devices of similar nature are employed for show window advertising to display matter describing or lauding merchandise to be found therein, or to be set up in a public place and to advertise large numbers of different merchants. In the former case the movement of the strip or sheet is ordinarily controlled by fixed contacts adapted to contact with the vehicle or some projecting part of the same to cause a shifting of the name strip; in the latter case some form of chronometric device is employed for regulating the time during which the strip shall remain stationary, and it is to this latter class of devices that the present improvements particularly relate, although it will be obvious that many of the features of construction and operation hereinafter described could equally well be employed with the other form of device.

Generally speaking the objects of the present invention are the provision of a device of this character which shall be wholly automatic and reliable in its operation; in which the various signs or exhibits shall be accurately registered with the view opening; in which the reversing of the movement of the strip shall take place with certainty and exactness at the end of each run; in which a minimum of power loss is developed; and in which the operating parts shall be reasonably simple and compact; while further objects and advantages relate to features of construction and will be made clear as the description proceeds.

One embodiment of my present invention is illustrated in the drawings accompanying this application wherein.

Describing the parts by reference characters, 1 and 2 represent, respectively, a pair of spaced vertical end plates, suitably secured together by horizontal rods 3—3, and surrounded by a casing 4, formed at one side with a suitable window 5 for the exhibition of the strip 10. This casing may take any suitable or convenient form within the scope of my invention, particular mention being made thereof in this case solely for purposes of clearness. Journaled in the plates 1 and 2 are a pair of parallel shafts 6, 7 carrying cylindrical drums 8 and 9, respectively, on which are wound the opposite ends of the flexible web or name strip 10. Suitable idler rollers are also provided, such as those shown at 11 and 12, for carrying the strip past the sight opening or window, and other idler rollers 13 and 14 are also shown herein arranged to draw the strip away from the drums, and to stretch it smoothly so that the contact members carried thereby may be exposed to the action of the contact fingers carried by the frame and by means of which the movement of the strip is controlled. Suitable brake shoes 15—15 are provided which act upon the drums 8, 9 to retard their movements and retain the strip in taut condition, these brake shoes being operated in any suitable manner as by the spring 16.

Figure 3:
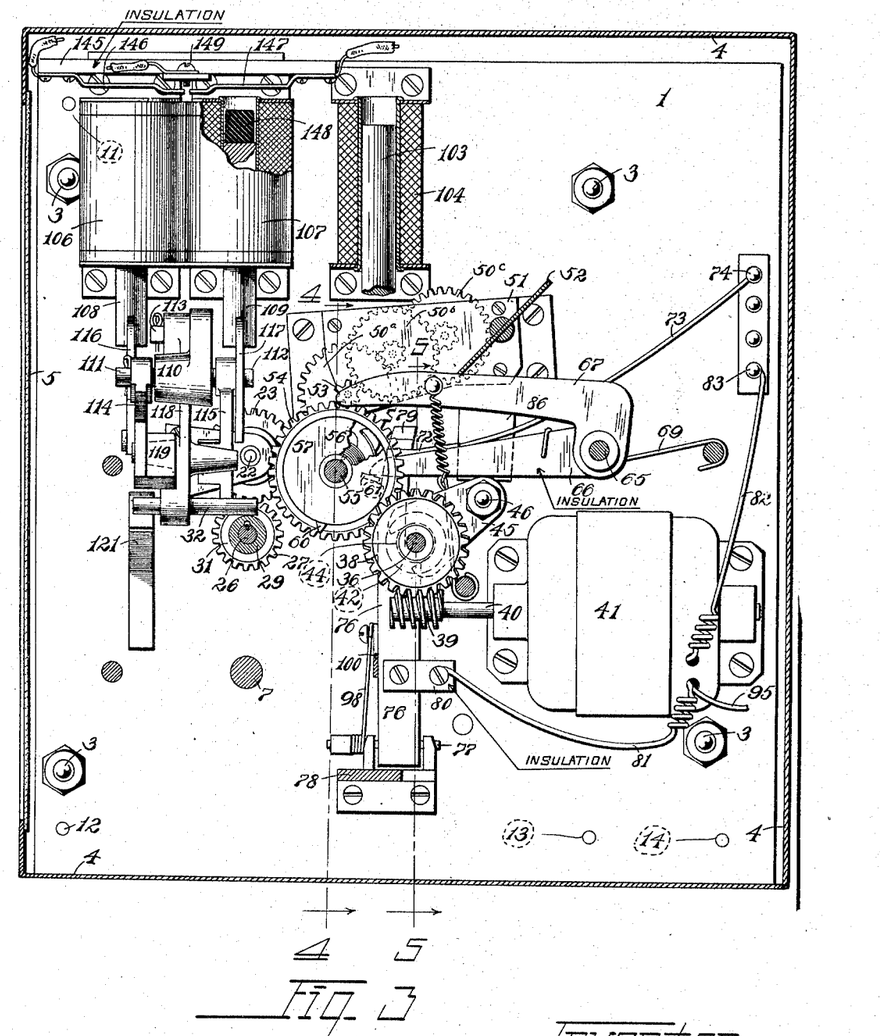
Fig. 3 is a vertical sectional view taken upon the broken line 3—3 of Fig. 2 and looking in the direction of the arrows.

According to the construction employed in the present machine, the drums are entirely free from each other excepting as connected through the strip 10, suitable means being employed for driving these drums independently so as to wind the strip onto the driven drum, meanwhile unwinding it from the opposite drum. Furthermore the brake shoes 15—15 are so supported and arranged as to tend to release the driven drum and to press more tightly upon the following drum so as to maintain the strip in tension without placing unnecessary strain upon the driving devices. For effecting this driving, the shaft 6 is provided with a gear wheel 20 meshing with a pinion 21 carried by a shaft 22 journaled in the plate 1 and having outside of this plate a second pinion 23. The outer end of the shaft 7 is journaled in a plate 24 spaced from but parallel to the plate 1, and inside of the plate 24 the shaft is provided with a gear 25. Journaled in the plates 1 and 24 is a driving shaft 26, upon the ends of which are loosely sleeved the pinions 27 and 28, respectively, the former meshing with the pinion 23 and the latter with the gear 25. Slidably but non-rotatably mounted upon this drive shaft, as by means of the spline shown in Fig. 3, is a clutch spool 29, having its ends formed with suitable clutch members 30—30 adapted to engage similar clutch members carried by the adjacent faces of the pinions 27 and 28, respectively, whereby either one may be caused to rotate simultaneously with the shaft 26. This clutch spool is also formed with the exterior groove 31 receiving the shifting bar 32, whereby the same is operated in a manner which will hereafter be explained. Outside of the plate 24, the shaft 26 is provided with the driving gear 33 and winding pinion 34.

Journaled in the plates 1 and 24 is a power shaft 36, having on its outer end a pinion 37 meshing with the driving gear 33. Between these plates the shaft 36 is provided with a worm gear 38 loosely sleeved thereon and meshing with the worm 39 carried by the shaft 40 of a motor 41, here shown as secured to the plate 1. Slidably but non-rotatably splined upon the shaft 36 between the gear 38 and the plate 1 is a clutch spool 42, the end of said spool and the adjacent face of the worm gear being formed with suitable interengaging teeth as shown at 43 in Fig. 7 whereby driving of the parts may be effected.

The exterior of the spool 42 is grooved as at 44 for the reception of a yoke 45 rigidly fixed to the horizontal reciprocable bar 46.

The motor 41 being not easily reversible in direction, it is necessary to reverse the movement of the drums mechanically, which is done by the clutch spool 29. Also, since a motor armature will ordinarily revolve for a time after the interruption of the current, it is difficult or impossible to bring the mechanism operated thereby to a given point while connected to the motor. The employment of the clutch 42 permits the disconnection of the power when the name strip has been brought to the proper location, the motor being thereafter allowed to slow down and stop without load, although it is preferable for purposes of economy that the energizing current be cut off soon after this unclutching, which operation is effected by means which will hereafter be described.

For determining the length of time during which the name strip shall remain stationary I have illustrated herein a simple chronometer consisting of a gear train illustrated generally at $50^a$, $50^b$, $50^c$, contained in a suitable case 51 carried by the plate 1, and ending in a vane or fan 52. This gear train is driven by the pinion 53 meshing with the time wheel 54, loosely sleeved on the winding shaft 55, and receiving power therefrom by means of a spiral spring 56 inclosed in the spring case 57, which rotates with the wheel. The shaft 55 projects through the plate 24 and carries at its outer end the gear wheel 58 which meshes with the pinion 34 heretofore mentioned, and by means of which power is diverted from the motor for the rewinding of the spring and the driving of the chronometer train. A suitable pawl 59 carried by the plate 24 prevents unwinding of the spring. While the name strip is standing still there is of course no necessity for operating the motor, wherefore the operating circuit is preferably opened during this period in interest of economy, but during this period the clock mechanism is necessarily running; and conversely, while the motor is operating to advance the main strip there is no necessity for the operation of the chronometer mechanism, wherefore I have provided means governed by the chronometer mechanism for unclutching the motor and breaking its circuit upon the arrival of the name strip at a station. Accordingly the chronometer is arranged, upon the arrival of the main strip at a designated station, to unclutch the motor and open the motor circuit, and also to reclutch the motor and restore the motor circuit prior to and preferably coincidentally with its stopping. The motor on the other hand, in the present embodiment through the medium of the name strip itself, serves to effect such contacts as are necessary to restore the various parts to the positions necessary to a renewal of the series. For this training, the time wheel 54 carries a radial projection or finger 60, arranged to effect the reclutching operation, and also a lateral projection or finger 61, which simultaneously restarts the motor and stops the chronometer.

Figure 7:
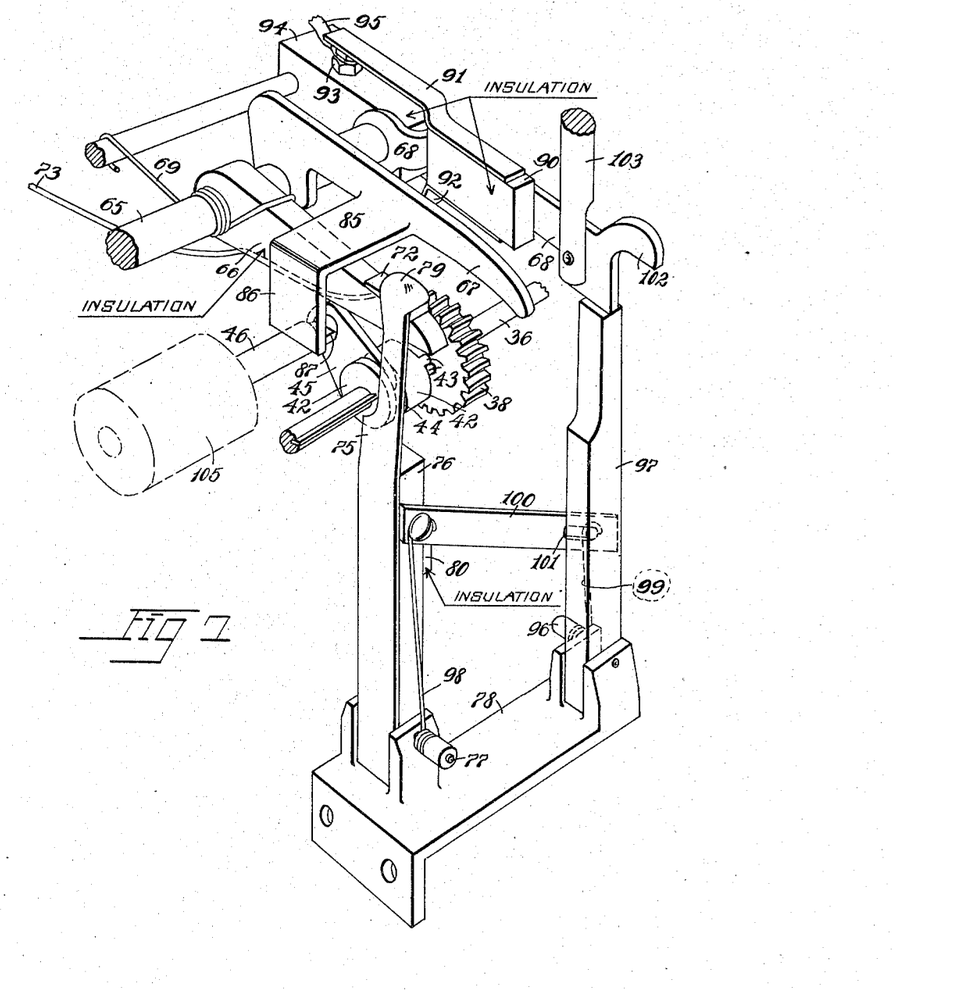
Fig. 7 is a perspective view of a portion of the motor-controlling mechanism illustrating its position during the time that the motor is running and the chronometric mechanism is at rest.
Figure 8:
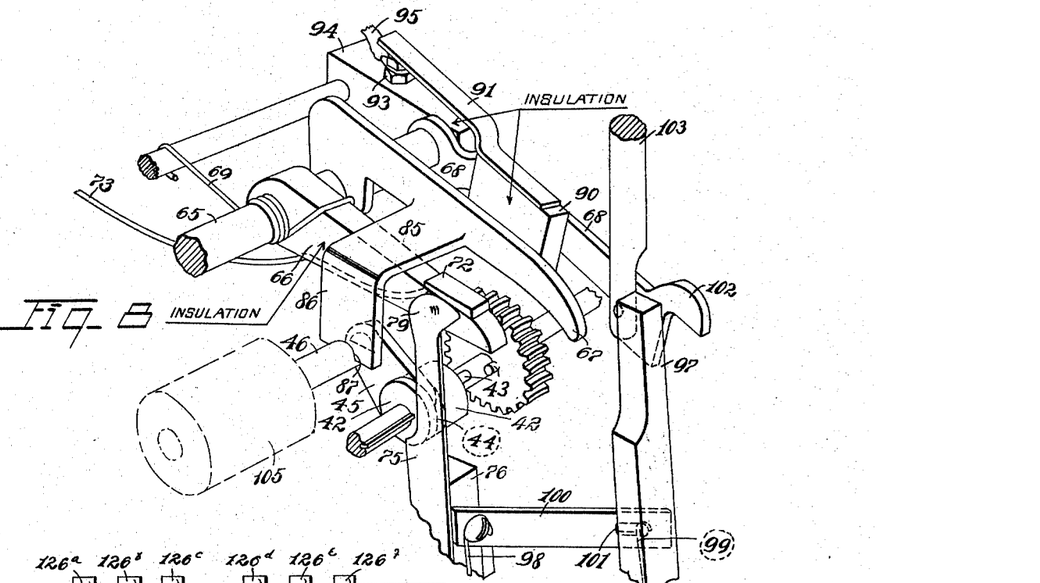
Fig. 8 is a view similar to Fig. 7 but showing the position of the parts when the chronometric devices are operating and the motor is at rest.
Figure 9:
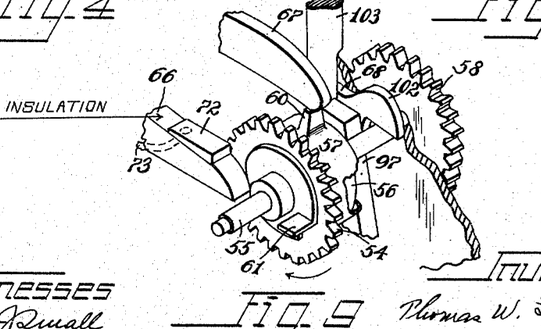
Fig. 9 is a perspective view of the controlling wheel of the chronometer.

Located between the plates 1 and 24 is a support 65 on which are independently pivoted three separate arms, 66, 67, and 68. The arm 66 is preferably of fiber or like material, and is normally held in a depressed position by means of a spring 69. Its length is such as to cause it to project to a point adjacent to the time wheel 54 as shown in Figs. 3 and 9 and to extend into the path of movement of the finger 61. Adjacent to its free end, this arm 66 carries an upwardly facing contact plate 72, connected by a suitable lead 73 with one of the main terminals 74. For coöperation with this contact plate I have provided the movable feather 75, whose lower end is secured to an insulating block 76 pivoted at 77 to a bracket 78, and having at its upper end a metallic shoe 79 adapted to overhang and make contact with the plate 72. This feather is placed in electrical connection with one pole of the motor by means of the connection plate 80 and cable 81, the other pole of the motor being connected by the cable 82 to the second pole 83 of the main terminal. Reference to Figs. 7 and 8 will show that the feather 75 projects closely past the end of the clutch spool 42, in such wise that the shifting of this spool to unclutching position will also shift the shoe 79 out of engagement with the plate 72, thereby breaking the motor circuit and stopping the motor. Also it will be seen that the effect of the time wheel and finger 61 is normally to maintain the plate 72 in snug contact with the shoe 79, and also to restrain the movement of the clock train, but that upon the unclutching movement of the spool 42 the arm 66 may be freely lifted by this finger, thus permitting the operation of the chronometer mechanism.

Figure 4:
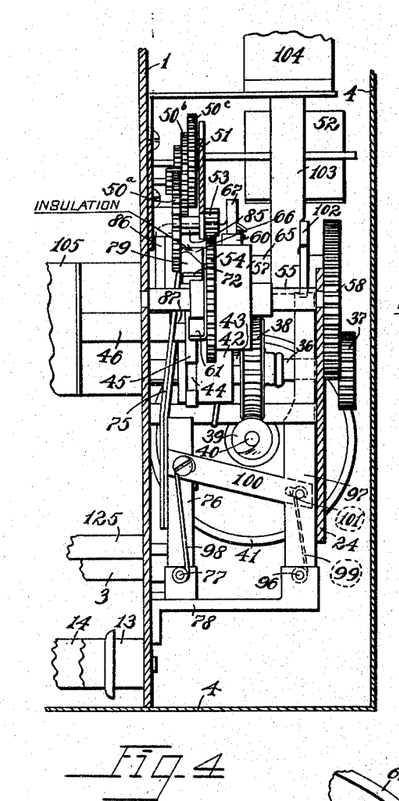
Fig. 4 is a sectional view taken upon the line 4—4 of Fig. 3 and looking in the direction of the arrows.
Figure 5:
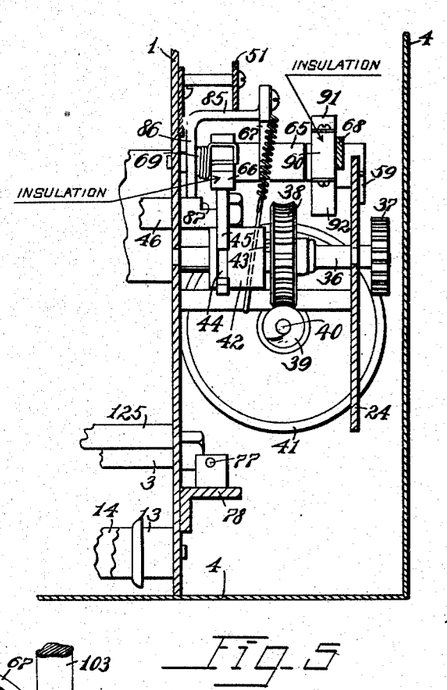
Fig. 5 is a similar view taken upon the line 5—5 of Fig. 3 and looking in the direction of the arrows.

The second arm 67, is merely a latch, being provided with a laterally projecting branch 85 terminating in a depending catch 86 normally resting upon the rod 46, and adapted upon the retraction of that rod to engage in a notch 87 formed therein so as to hold that rod and the clutch spool 42 in outward position as shown in Fig. 8. The free end of this arm projects into the path of movement of the cam finger 60 as shown in Figs. 4 and 9, by which it is lifted out of the notch 87 upon the rotation of the time wheel as will hereafter be described.

Figure 11:
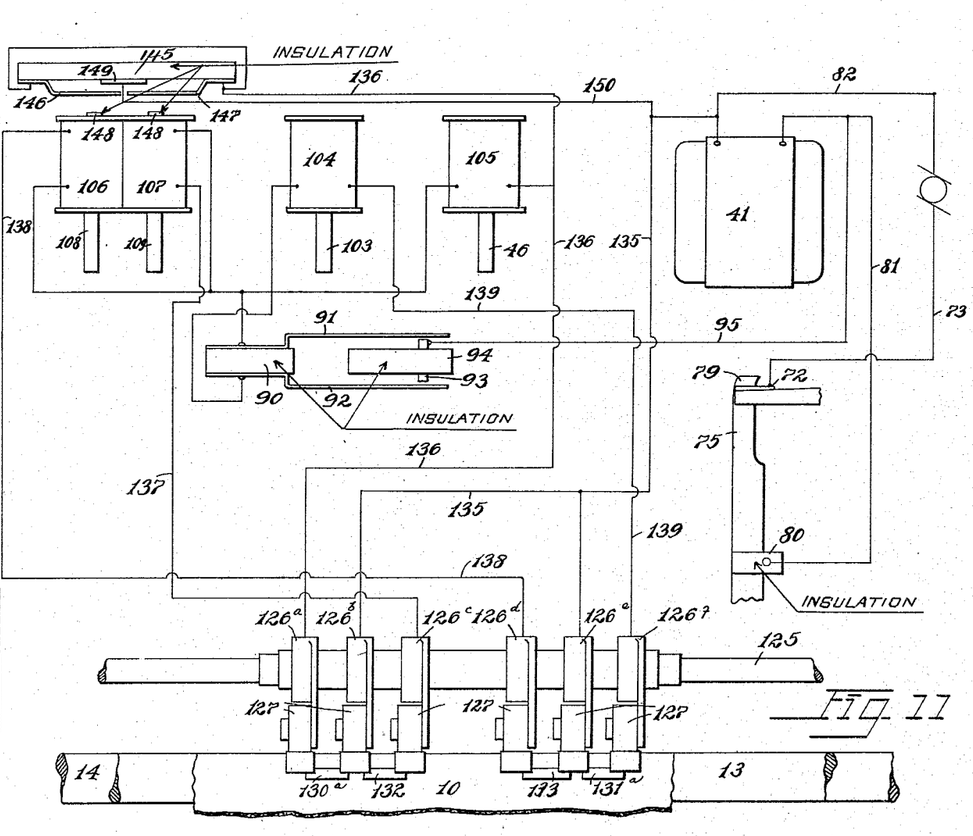
Fig. 11 is a diagrammatic view of the various electrical connections employed in the present embodiment.

The arm 68 carries an insulating block 90 provided with switching mechanism, in the present embodiment consisting of a pair of metallic fingers 91 and 92 above and below, respectively, and arranged to make alternate contact with a metallic stud 93 carried by a fixed insulating block 94, the arrangement here shown being such that when the arm 68 is elevated, contact is made at 91, 93, and when said arm is depressed contact is made at 92, 93. Reference to Fig. 11 will show that the stud 93 communicates by way of the lead 95 with the motor cable 81.

Pivoted beneath the end of the arm 68 upon an axis 96 substantially parallel to the axis 77 is an upright prop 97 whose upper end is adapted to support the arm 68 as shown in Fig. 7. The feather 75 and prop 97 are provided with independent springs 98 and 99, respectively, whereby they are normally held forward, and a suitable connection 100 is provided between the two members whereby one can be operated from the other, a certain amount of lost motion being provided as by the slot 101 for a purpose to be hereafter described. Any suitable means, such as the shoulder 102 may be provided for limiting the downward movement of the arm 68, while the vertical armature 103 of a solenoid 104 secured immediately thereabove serves for the raising of the same.

Figure 1:
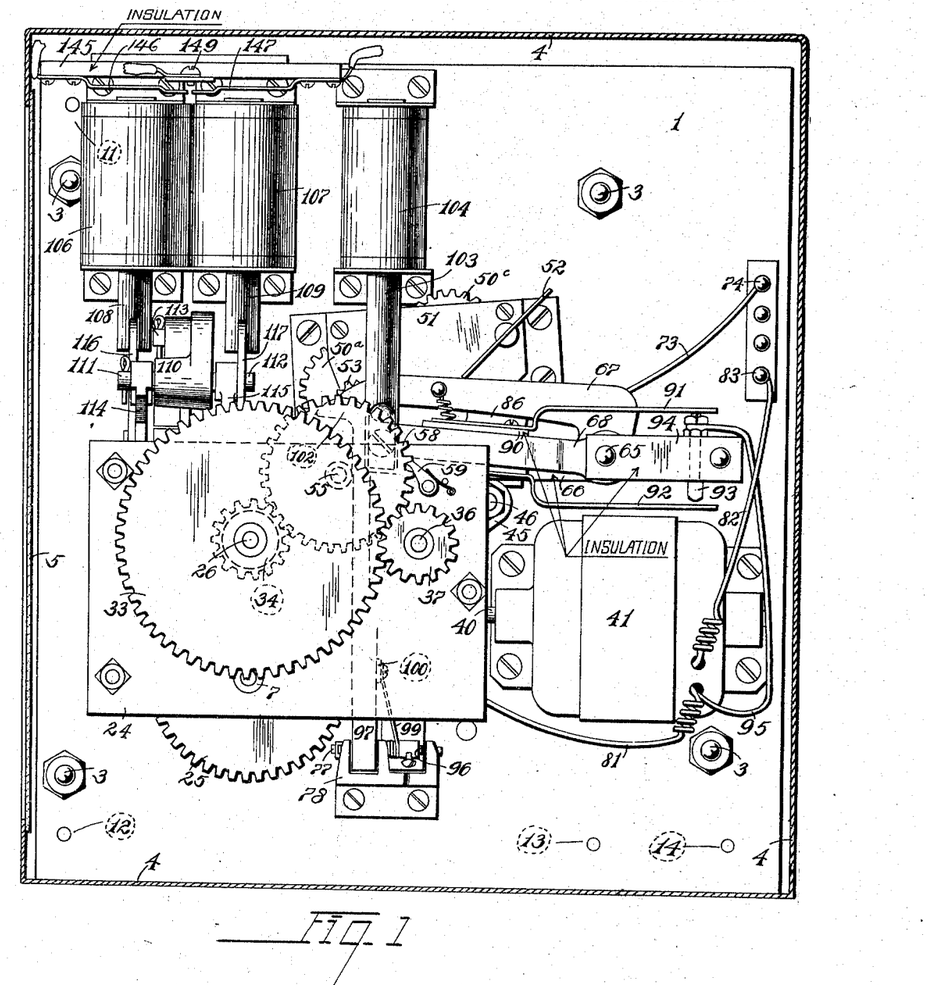
Figure 1 represents a right hand elevation of a complete machine constructed in accordance with my invention.
Figure 2:
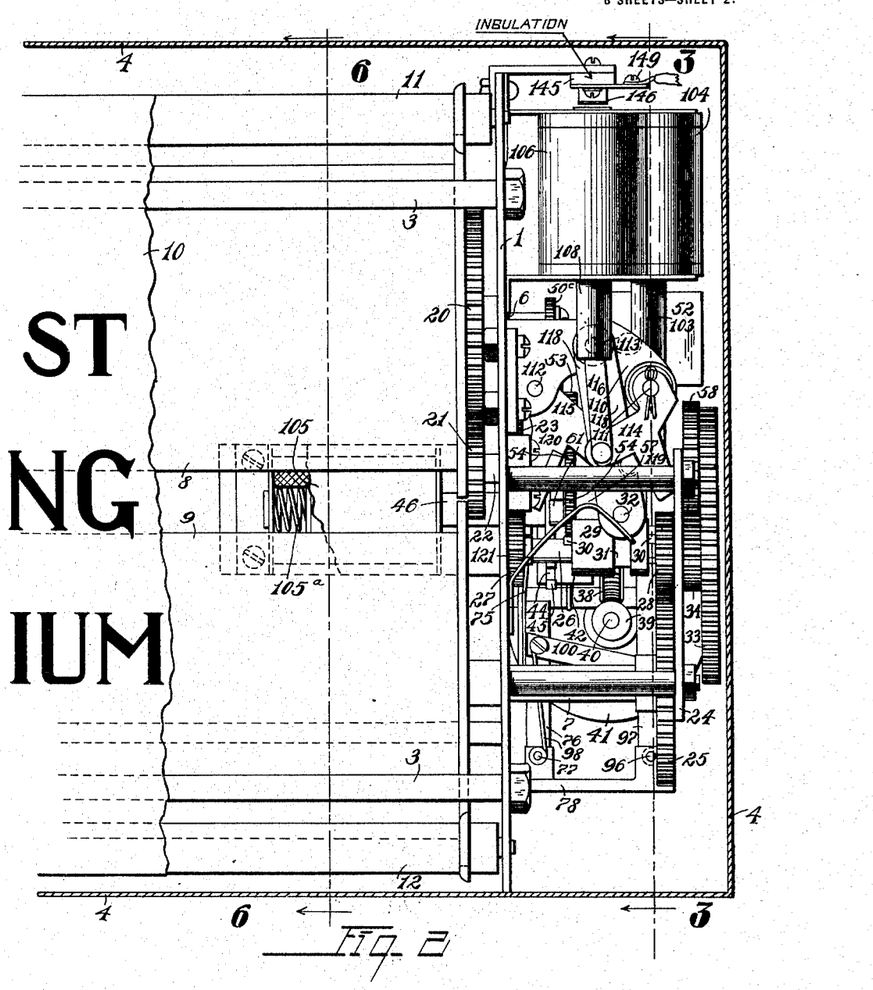
Fig. 2 is a front elevation of the same end of the machine, a portion of the web or name strip being broken away.

The rod 46, heretofore mentioned, also forms or is connected to the armature of a horizontal solenoid 105 suitably carried by the frame of the machine as by being affixed to the inner face of the plate 1, and this rod 46 is normally held in outward position by means of a suitable spiral spring 105ᵃ (see Fig. 2).

For operating the reversing clutch 29 I have provided a pair of vertical solenoids 106 and 107, respectively, secured to the outer face of the plate 1 above the shaft 26 and having depending armatures 108 and 109, respectively. Secured to the outer face of the plate 1 below and between the solenoids 106 and 107 is a bracket 110 which carries the studs 111, 112 and 113. Pivoted upon the two former studs are the arms 114 and 115, respectively, whose free ends are connected by links 116 and 117, respectively, with the armatures 108 and 109, respectively. Pivoted to the stud 113 is the arm 118 whose lower end carries the bar 32 heretofore described. In addition, the arms 114 and 115 are provided with depending branches 119 and 120, respectively, arranged to contact suitable projections carried by the arm 118 so as to swing the same from one side to the other upon the energization of the appropriate solenoid. I have further shown a hump spring 121 as projecting into the path of movement of the bar 32 so that, upon the movement of that bar past the center under the influence of the solenoid, the clutch spool may be thrown positively toward the end of its movement and its rebounding and chattering entirely prevented.

Figure 6:
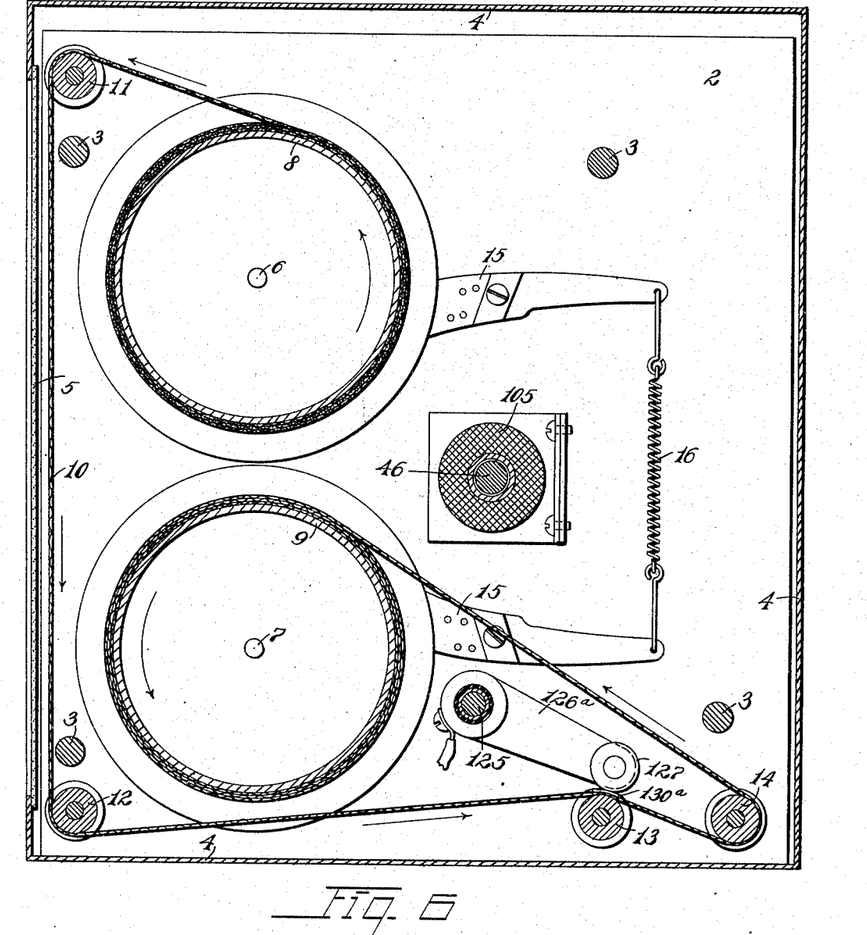
Fig. 6 is a cross sectional view of the machine taken upon the line 6—6 of Fig. 2 and looking in the direction of the arrows.
Figure 10:
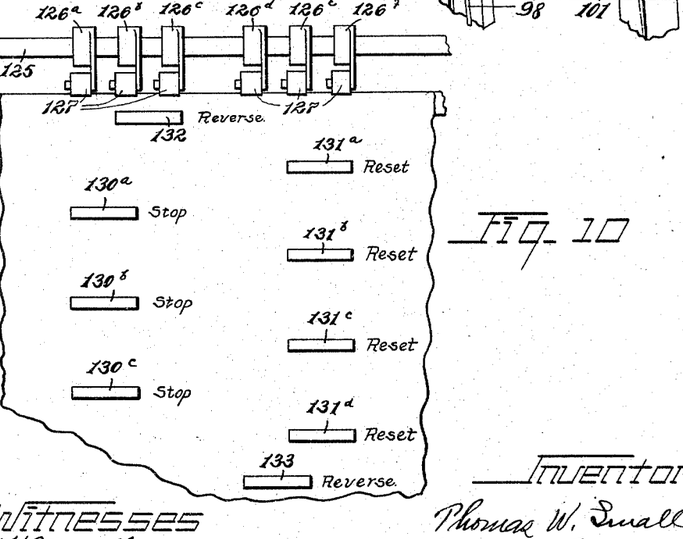
Fig. 10 is a diagrammatic view of a portion of the sheet or name strip, showing its conducting members in combination with the various fingers which contact the same.

For stopping the movement of the name strip so as to cause an indication thereon to remain in registration with the window, and also for operating the reversing mechanism at the end of each strip, I provide flexible conducting devices carried by the strip itself and adapted to make contact with fixed fingers carried by the frame in much the same manner as described and claimed in my former application filed January 9, 1915, Serial No. 741,131. For this purpose I have shown the frame as provided with a suitable supporting rod 125 having pivoted thereon a plurality of independent insulated spring fingers, here shown as six in number, and indicated at $126^a$, $126^b$, $126^c$, $126^d$, $126^e$, $126^f$. The free ends of these fingers are provided with suitable contact means, such as the rollers 127, arranged to run along over the strip and contact the conductors carried thereby, the place of contact preferably being stretched and flattened as by means of the roller 13 (Fig. 6). The contact members carried by the web may vary greatly in number, arrangement, position, and function within the terms of my invention, but in the present embodiment comprise the stopping contacts $130^a$, $130^b$, $130^c$, etc.; the resetting contact $131^a$, $131^b$, $131^c$, $131^d$, and the reversing contacts 132 and 133. While I have illustrated in Fig. 10 a name strip having four designations or stations only, it will be obvious that the same could be extended to any length or number desired without variation from my invention.

It will also be obvious that many changes in the wiring and electrical connection of the members could be employed within the scope of my invention, although the one which I prefer and which I have illustrated here is as follows, particular reference being had to Fig. 11: Fingers $126^b$ and $126^e$ are merely return fingers, and are connected in parallel by means of the lead 135 with one pole of the motor, such as that at 82. The stopping contacts 130 are arranged to bridge the fingers $126^a$ and $126^b$, and the finger $126^a$ is connected by means of the lead 136 with the solenoid 105. The reversing contact 132 at one end is arranged to bridge the fingers $126^b$ and $126^c$, the latter being connected by means of the lead 137 with the solenoid 107. The reversing contact at the opposite end of the web is arranged to bridge the fingers $126^d$ and $126^e$, the former of these being connected by means of the lead 138 with the reversing solenoid 106. The resetting contacts 131 are arranged to bridge the fingers $126^e$ and $126^f$, the latter being connected by means of the lead 139 with the resetting solenoid 104. The opposite side of the solenoid 105, 106 and 107 are connected to the finger 91, while the rear side of the solenoid 104 is connected to the finger 92.

The operation of the mechanism is as follows, beginning with the various parts in the position illustrated in Figs. 2, 3, 4, 5 and 7: It will first be noted that the chronometer train is at rest owing to the engagement of the finger 61 with the arm 66, but the motor 41 is in operation owing to the contact 72, 79, which this finger effects. The clutch spool 42 being in engagement with the worm gear 38, motion is transmitted from the motor spindle to the shaft 36, pinion 37, and gear 33 to the shaft 26. The clutch spool 29 being also at the outer limit of its movement, the motion of the shaft 26 is communicated to the pinion 28 and gear 25 which rotates the shaft 7 and drum 9, thereby operating that drum in the direction shown by the arrow in Fig. 6. The arm 68 is meanwhile supported upon the top of the prop 97 as shown in Fig. 7, and the finger 91 is in contact with the post 93. Upon the arrival of one of the stopping contacts at the roller 13, (such as that $130^a$) an impulse passes from the terminal 82 through the wire 135 and finger $126^b$ to the finger $126^a$ and thence by way of the lead 136 to the solenoid 105, returning from the solenoid via finger 91, post 93 and lead 95. The energization of this solenoid shifts the rod 46 and unclutches the spool 42, the latch 86 thereupon engaging the notch 87 so as to hold this spool against return movement. At the same time the movement of the spool shifts the feather 75 to one side so as to break contact at 72, 79, thus deënergizing the motor, while the pull upon the connection 100 draws the prop 97 from beneath the arm 68 which thereupon falls together with the armature 103 so as to break contact at the point 91, 93 and establish contact at the point 92, 93. This, therefore, cuts out the solenoid 105 and prevents waste of current therethrough, sufficient looseness of play being afforded between the latch 86 and notch 87 to insure that the latch will be properly caught before the arm 68 shall drop. During the rotation of the gear 33, the pinion 34 has been rotating the shaft 55 through the agency of the winding gear 58, thereby storing energy in the spring 56, which, immediately upon the removal of the shoe 79, causes the rotation of the time gear 54, the arm 66 rising freely to permit this movement. At some time during the rotation of this time gear, the cam finger 60 engages the end of the arm 67 and raises the same to its original position, thereupon freeing the armature 46 which now retakes its initial position under the influence of the spring 105ª, bearing with it the clutch spool 42. This also permits the return of the feather 75 to its initial position under the influence of its spring 98, the arm 66 having meanwhile dropped to a lower point (after its disengagement by the finger 61) so that contact is not now made through the motor. The continued rotation of the time gear 54, however, brings the finger 61 into contact with the arm 66 which is thereupon raised until the circuit is again closed at the point 72, 79 whereupon the chronometer train stops and the motor starts. However the mechanism has not yet returned entirely to its initial position from the fact that it is the finger 92 which now contacts with the stud 93 instead of the finger 91, and this is a necessary condition from the fact that all of the time the clock mechanism has been in motion, the stopping contact 130ª has remained in contact with the fingers 126ª—126ᵇ so that if the contact 91, 93 were still established the only result would be to reënergize the solenoid 105 and repeat the operation of the chronometer train. However the lost motion at 101 has permitted the feather 75 to return to original position but without affecting the prop 97 so that a forward movement of the web is again initiated which promptly moves the contact 130ª away from the fingers and causes the contact 131ª to approach thereto whereupon a circuit is established between 126ᵉ and 126ᶠ. The effect of this is to energize solenoid 104 (via 139, 92, 93, 95) which restores the arm 68 to initial position and restores the contact at 91, 93 breaking the contact at 92, 93. The mechanism has now entirely reassumed its initial condition, so that upon the arrival at the roller 13 of the next succeeding stopping contact, such as 130ᵇ, the same cycle of events is repeated, and in the same order, and is repeated again and again until the end of the web is reached.

The advancing movement of the main strip finally brings up the reversing contact 133 which bridges the fingers 126ᵈ and 126ᵉ, and thus establishes a circuit through the solenoid 106, the circuit being 82, 135, 126ᵉ, 126ᵈ, 138, 106, 91, 93, 95, 81, 80, 75, 79, 72, 73. The attraction of the armature 108 rocks the lever 114 and throws the arm 118 to the opposite limit of its movement, disconnecting the clutch spool 29 from the pinion 18 and throwing it into engagement with the pinion 27. Thereafter the movement of the shaft 26 is conveyed by way of the pinion 23, 21, and gear 20 to the drum 8 whereby the name strip is prepared to advance in the opposite direction. At the same time it is desirable that the name strip should be halted for a period before its return movement, since otherwise the last indication exhibited would be exposed for two successive periods practically without intermission. Theoretically it might be practical to employ at the same time with the reversing strip 133 a connecting strip 130, since there is nothing fundamentally to prevent the actuation of the solenoids 106 and 105 simultaneously by means of their respective fingers. However, there is a practical disadvantage that if one of these contact members should establish circuit a fractional part of a second before the other, the forward movement of the main strip would be arrested instantly so that the second would never come into contact at all. Accordingly, for the purpose of producing both actions through a single contact, I have provided above the reversing solenoids 106 and 107 a contact device comprising an insulated base 145, carrying a pair of flexible contact fingers 146 and 147, one of which intersects the path of movement of each of the armatures 108 and 109, the upper ends of those armatures being topped by means of insulating buttons 148 (see Fig. 3). Secured to the block 145 in a position to be contacted by the depression of either spring but normally out of contact with both of the same is a metallic stud 149 which is connected by means of the lead 150 with the lead 135. The fingers 146 and 147 are both connected to the lead 136. Thus upon the energizing of the solenoid 106 as already explained, the upward movement of the armature 108 will establish contact between the finger 146 and the stud 149, thereby creating an impulse through the solenoid 105 by way of the path, 82, 150, 149, 146, 136, 105, 91, 93, 95, 81, 80, 75, 79, 72 and 73. This throws the clutch spool 42 out of engagement with the worm gear as heretofore explained and arrests the further movement of the main strip, although the reversal of driving connection has been accomplished so that upon the conclusion of the interval defined by the chronometer train, the same operation continues, the members 130 still acting as stopping contacts, and the members 131 as resetting contacts.

It is obvious that the constructions, arrangements, and design of mechanical parts and apparatus whereby the above functions may be carried out within the scope of my inventive idea are of great variety so that it would be hopeless to attempt to illustrate or suggest the modifications which could be made. While I have described my invention in detail I do not therefore propose to be limited to any of such details except as the same are specifically included in the claims hereto annexed or rendered necessary by the prior art.

Having thus described my invention, what I claim is:

1. In a device of the character described, the combination with a movable strip and means for propelling the same, of contact members actuated by the movement of the strip to close an electrical circuit, means in said circuit for arresting the operation of said propelling means, means operating subsequently to such arresting for breaking said circuit, means outside of said circuit for repeating the operation of said propelling means, and means for restoring said circuit prior to the next actuation of said contact members.

2. In a device of the character described, the combination with a movable strip and means for propelling the same, of an electrical circuit, a plurality of spaced contact devices carried by said strip and adapted to complete said circuit upon arrival at a given point, current operated means included in said circuit and adapted to arrest the operation of said propelling means, a circuit breaking device in said circuit and operatively connected to said current operated means so as to be actuated after the arrest of said propelling means, means outside of said circuit for repeating the operating of said propelling means, and mechanism operative after the starting of said strip and prior to the succeeding actuation of said contact devices for restoring said circuit breaker.

3. In a device of the character described, the combination with a movable strip and means for propelling the same, of an electrical circuit, a plurality of spaced contact devices carried by said strip and adapted to complete said circuit upon arrival at a given point, current operated means included in said circuit and adapted to arrest the operation of said propelling means, a circuit breaking device in said circuit and operatively connected to said current operated means so as to be actuated after the arrest of said propelling means, means outside of said circuit for repeating the operation of said propelling means, additional contact devices carried by said strip intermediate said first devices, a restoring circuit containing said last devices, and means included in said restoring circuit for closing said circuit breaking device.

4. In a device of the character described, the combination with a movable strip and means for propelling the same, of an electrical circuit having branches, a switching device controlling said branches, current operated means included in one of said branches and adapted to arrest the operation of said propelling means, current operated means included in the other of said branches, both of said current operated means being connected to said switching device in such a way as to disconnect itself and throw the other branch into circuit, and contact means carried by said strip and adapted to close the circuit through said branches alternately.

5. In a device of the character described, the combination with a movable strip and means for propelling the same, of a switching device having two poles, a current actuated device in circuit with one pole and adapted when actuated to disconnect said propelling means, a lost motion connection between said current actuated device and said switching device adapted when actuated to permit the connection of the other of said poles in circuit, a current actuated device in circuit with said other pole and adapted when actuated to throw said first pole back into circuit, contact means operated by said strip to close the circuit alternately through said current actuated devices.

6. In a device of the character described, the combination, with a movable strip, of an electric motor, means for driving said strip from said motor, said means including a clutch, means for throwing said clutch to inoperative position to stop said strip, and means operative by the disconnecting movement of said clutch for opening the circuit through said motor.

7. In a device of the character described, the combination, with a movable strip, of an electric motor, means for driving said strip from said motor, said means including a clutch, a current-operated device for disengaging said clutch, spaced means carried by said strip for closing an electric circuit through said device, and means operative during the last part of such clutch disengagement for opening the circuit through said motor.

8. In a device of the character described, the combination with a movable strip and means for propelling the same, of contact members actuated by the movement of said strip to close an electrical circuit, means for discontinuing power to said strip propelling means when said strip reaches a definite point, means for timing the duration of discontinuance, means for diverting power to said timing mechanism, and means for stopping said timing mechanism and restarting said strip moving means.

9. In a device of the kind described, the combination of a movable strip and means for moving the same, of contact members actuated by the movement of said strip to close an electrical circuit to arrest the movement of the strip, mechanical means for timing the rest period of said strip, said means becoming operative upon the breaking of said circuit and adapted to reëstablish said circuit as said mechanical timing means concludes its cycle of operations.

10. In a device of the kind described, the combination of a movable strip and motor for moving the same, of contact members actuated by the movement of said strip to close an electrical circuit, and a clock mechanism and means governed by the movement of the strip for unclutching the motor and breaking the circuit upon the arrival of the strip at a definite point and means for re-clutching said motor and restoring its circuit coincidentally with the stoppage of said clock mechanism.

11. In a device of the kind described, the combination with a movable strip having contacts thereon, and a motor for moving said strip, of contact members forming a part of an electrical circuit in which said motor is located and adapted to arrest the movement of said strip, mechanical means for transmitting motion from said motor to said strip, a clock mechanism for timing the rest periods of said strip, and electrical means for cutting out the motor and setting the clock mechanism into operation, said clock mechanism at the conclusion of its movement reëstablishing the motor circuit and restarting said motor.

12. In a device of the kind described, the combination with a strip and means for moving same, of contacts and switches forming a part of an electrical circuit controlling the strip moving means through the medium of a timing mechanism and motor, contacts upon said strip adapted to engage said first mentioned contacts, said strip contacts being arranged in differently spaced rows, one row being adapted to control the stopping of said strip moving means and the other row being adapted to affect a resetting of the strip moving means through the medium of the timing mechanism.

13. In a device of the kind described, the combination with a strip and means for moving the same, of a series of stop contacts upon said strip, a series of reset contacts upon said strip and alternating with said stop contacts, and contact fingers coöperating with said contacts and forming part of an electrical circuit controlling the strip moving means as set forth.

14. In a device of the kind described, a display strip and means for moving the same, of a series of stop contacts upon said strip, a series of reset contacts upon said strip and alternating with said stop contacts, and reverse contacts at opposite ends of said series, and contact fingers coöperating with said contacts and forming parts of an electrical circuit controlling the strip moving means as set forth.

15. In a device of the kind described, the combination of a strip having contacts, of fingers contacting with said contacts, said fingers constituting parts of electrical circuits having a common source, a motor in said circuits, means operated from said motor for moving said strip, a timing mechanism, means controlled by said contacts for simultaneously cutting off the motor and starting the timing mechanism, and means controlled by the timing mechanism for restarting the motor.

16. In a device of the kind described, the combination with a strip having contacts, of fingers contacting with said contacts, said fingers constituting said parts of the electrical circuits having a common source, a motor in said circuits, means operative from said motor for moving said strip, and a timing mechanism adapted to be set in motion when said motor is cut off, said timing mechanism cutting in said motor at the completion of its cycle of operation.

17. In a device of the kind described, the combination with a strip having a plurality of contacts, of fingers adapted to engage said contacts, said fingers constituting parts of electrical circuits, a motor in said circuits, means operative from said motor for moving said strip, and a timing mechanism, said timing mechanism being released and made operative when one of the circuits is closed, the closing of said circuit and release of said timing mechanism being simultaneous with the cutting out of the motor for a predetermined time.

18. In a device of the kind described, the combination with a strip having a plurality of contacts, of fingers adapted to engage said contacts, said fingers constituting parts of electrical circuits, a motor in said circuits, means operative from said motor for moving said strip, and a timing mechanism, said timing mechanism being released and made operative when one of the circuits is closed, the closing of said circuit and the release of said timing mechanism being simultaneous with the cutting out of the motor for a predetermined time together with means for stopping said timing mechanism and simultaneously cutting into said motor.

19. In a device of the kind described, the combination with a display strip having contacts thereon, of contact members adapted to engage contacts upon said strip and arrest the motion of said strip, means for moving said strip in either direction, a motor adapted to move in one direction and transmit motion to the strip moving means, and a timing mechanism for controlling the periods of rest of said strip and for stopping and starting the motor, said timing mechanism being controlled by the contacts carried by the strip.

20. In a device of the kind described, the combination with a display strip carrying a plurality of contacts, of means for moving said strip in either direction, a motor adapted to move in one direction and transmit power to the strip moving means, a timing mechanism under the control of the strip contacts through the medium of electrically operated means, said timing mechanism being adapted to regulate the periods of rest of the strip also the stopping and starting of the motor together with electrically operated means for reversing the strip moving mechanism at the completion of the line of movement in either direction.

21. In a device of the character described, the combination of a movable strip and means for propelling the same, a series of contacts carried by said strip, said contacts being arranged in rows, one row being adapted to control the stopping of the strip operating mechanism, the other row being adapted to control the resetting of the operating mechanism, contacts at opposite ends of said rows for reversing the direction of the strip moving means, said strip reversing means including a pair of solenoids, means for holding the strip at rest for a definite period of time, said means including a solenoid, together with electrically operated means for preventing the immediate operation of the strip moving means upon the reversal of said means.

22. In a device of the kind described, the combination of a display strip having contacts thereon, contact members adapted to engage said contacts, means for moving said strip in either direction, a motor adapted to move in one direction and transmit power to the strip moving means, a timing mechanism adapted to regulate the periods of rest of the strip, electrically operated means for stopping the strip and starting said timing mechanism and simultaneously cutting the motor out, said means including a solenoid and a double switch in circuit with said contacts, together with electrically operated means for reversing the strip moving means, said electrically operated means including a pair of solenoids, and a fourth solenoid adapted to operate said switch.

In testimony whereof, I hereunto affix my signature in the presence of two witnesses.

THOMAS W. SMALL.

Witnesses:
HUGH B. McGILL,
H. J. SMALL.

Copies of this patent may be obtained for five cents each, by addressing the "Commissioner of Patents, Washington, D. C."